United States Patent [19]
Kleine et al.

[11] 3,905,100
[45] Sept. 16, 1975

[54] CARPET CUTTER GUIDE

[76] Inventors: Richard E. Kleine, 46 N. Mickley, Apt. C.; Thomas W. Killion, 6550 Doris Dr., both of Indianapolis, Ind. 46224

[22] Filed: June 6, 1974

[21] Appl. No.: 477,041

[52] U.S. Cl. .................... 30/124; 30/293; 269/295
[51] Int. Cl.² ........................................ B26B 3/08
[58] Field of Search ............ 30/233, 286, 289, 292, 30/124, 293; 269/87.2, 295

[56] References Cited
UNITED STATES PATENTS

| | | | |
|---|---|---|---|
| 514,096 | 2/1894 | Sheffield | 269/295 X |
| 1,275,899 | 8/1918 | Freydberg | 269/295 |
| 1,341,445 | 5/1920 | Stanley | 269/295 |
| 2,661,046 | 12/1953 | Dain | 269/87.2 |
| 3,199,860 | 8/1965 | Moberg | 269/87.2 |

FOREIGN PATENTS OR APPLICATIONS

| | | | |
|---|---|---|---|
| 576,166 | 5/1959 | Canada | 30/286 |

*Primary Examiner*—Al Lawrence Smith
*Assistant Examiner*—J. C. Peters
*Attorney, Agent, or Firm*—Woodard, Weikart, Emhardt & Naughton

[57] ABSTRACT

A carpet cutter guide which allows the convenient and accurate cutting of bulk rolls of carpeting to precise widths and lengths. The entire cutting operation can be performed conveniently by a single person. Additionally the cutting apparatus is conveniently installed, easily moved, and is adaptable to almost any cutting device. Specifically, the guide comprises a series of slots or guide slots which are receptive to a guide member of a carpet cutter and which extend the width of normal carpeting rolls. These guide slots are attached to a movable cutter holder allowing convenient mobility to the cutter.

7 Claims, 5 Drawing Figures

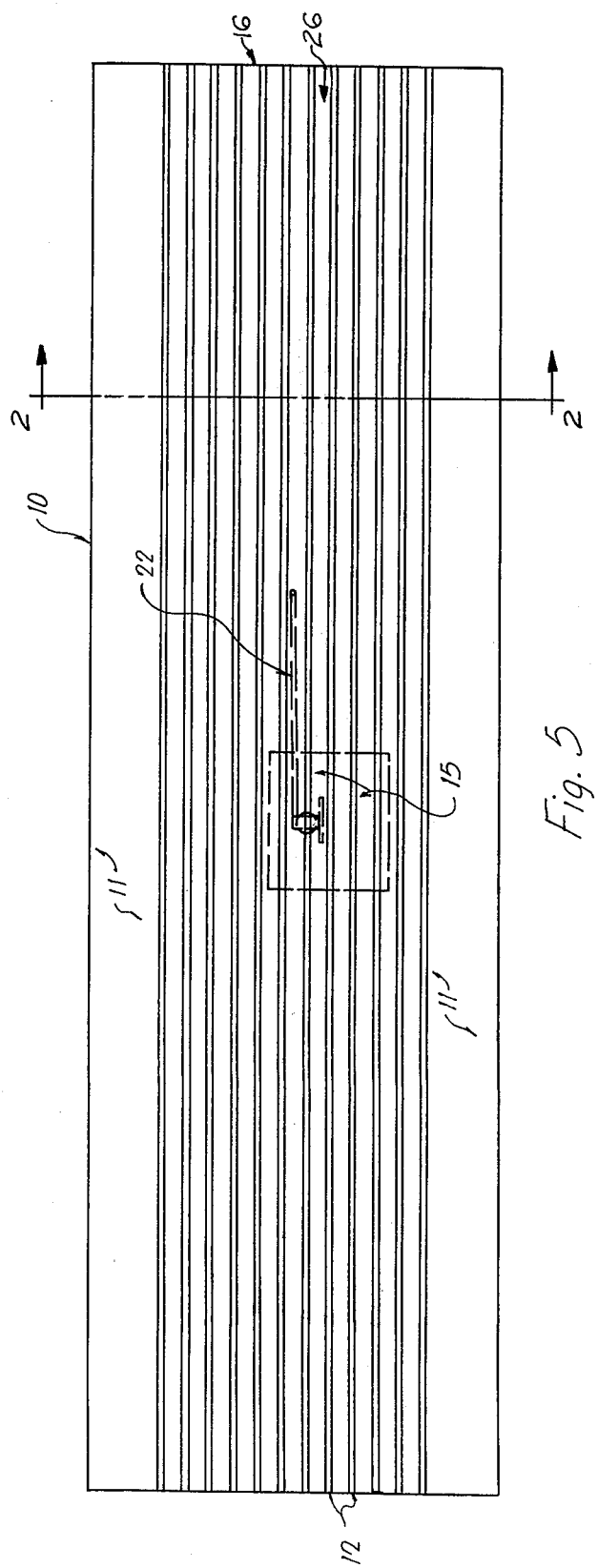

CARPET CUTTER GUIDE

BACKGROUND OF THE INVENTION

1. Field of the Invention

This invention relates to means for guiding tools having a template surface and extending from edge to edge of a sheet, web or roll.

2. Description of the Prior Art

In the past, generally rectangular rugs and other woven and non-woven sheet material have been formed automatically by rug making machines and knitting machines after which the edges have been bound or hemmed to prevent ravelling when the article has been rolled or folded for storage in shipping.

Non-rectangular woven and non-woven sheet material such as rugs, table cloths and the like, normally have required that a template or pattern be placed on the material after which a hand-operated cutter is used to cut the material to the configuration of the template. This has not always been satisfactory due to the amount of manual labor involved, as well as the shifting of the template while in use, and has resulted in pieces of material which were not true to the pattern.

Prior art carpet cutting apparatuses have generally employed a powered cutter having both a horizontal motion (to move across the carpet) and a vertical motion (to cut the carpet). For example, rotary cutting blades of the type similar to a rotary knife and vertical reciprocating saws have been used. Such prior art devices are unsatisfactory for cutting certain material and require not only a horizontal drive, but also a power drive to actuate the cutter blade. The blade power drive is costly and presents additional design complications because of the need to supply power to the drive as the cutter is moved along a cutting path. Also, powered cutters of this type produce significant debris which can foul the equipment.

Other machines for cutting cloth that have been used in the past are exemplified by U.S. Pat. No. 1,319,809 to Zawistowski; U.S. Pat. No. 2,627,657 to Etchen; and U.S. Pat. No. 2,861,340 to Hazard. These prior devices have either been manually operated or the device has been stationary and the cloth has been moved relative to the cutter. Chain driven apparatus for cutting predetermined contours and relatively flat objects also have been known as shown by U.S. Pat. No. 3,517,901 to Luckenbach and U.S. Pat. No. 2,536,650 to Martinez. Thus with the cutters presently available for use there has been a long felt need for an accurate but relatively inexpensive carpet cutter guide which is durable enough to withstand the treatment normally resulting from carpet-cutting operations.

SUMMARY OF THE INVENTION

This invention relates to apparatus for guiding a cutter along the width of a flexible sheet of material, generally carpeting, comprising a base support structure; a plurality of grooves in said base support structure; a surface structure defining openings into said grooves and a movable cutter holder.

It is an object of this invention to provide a cutter guide apparatus which allows a single operator to accurately cut a rug or other sheet material from edge to edge.

It is a further object of this invention to provide a carpet cutter guide apparatus having means for allowing individual cuts to be made at 1 inch intervals.

It is a still further object of this invention to provide a carpet cutter guide apparatus wherein a plurality of grooves are defined, said grooves being receptive to guide members which can be attached to any of the commonly used carpet cutters.

These and other objects of this invention will become apparent from the following description of the preferred embodiment.

BRIEF DESCRIPTION OF THE DRAWINGS

FIG. 5 is a top view of the assembled structure with carpet and cutter in place.

DESCRIPTION OF THE PREFERRED EMBODIMENT

Figure 1:
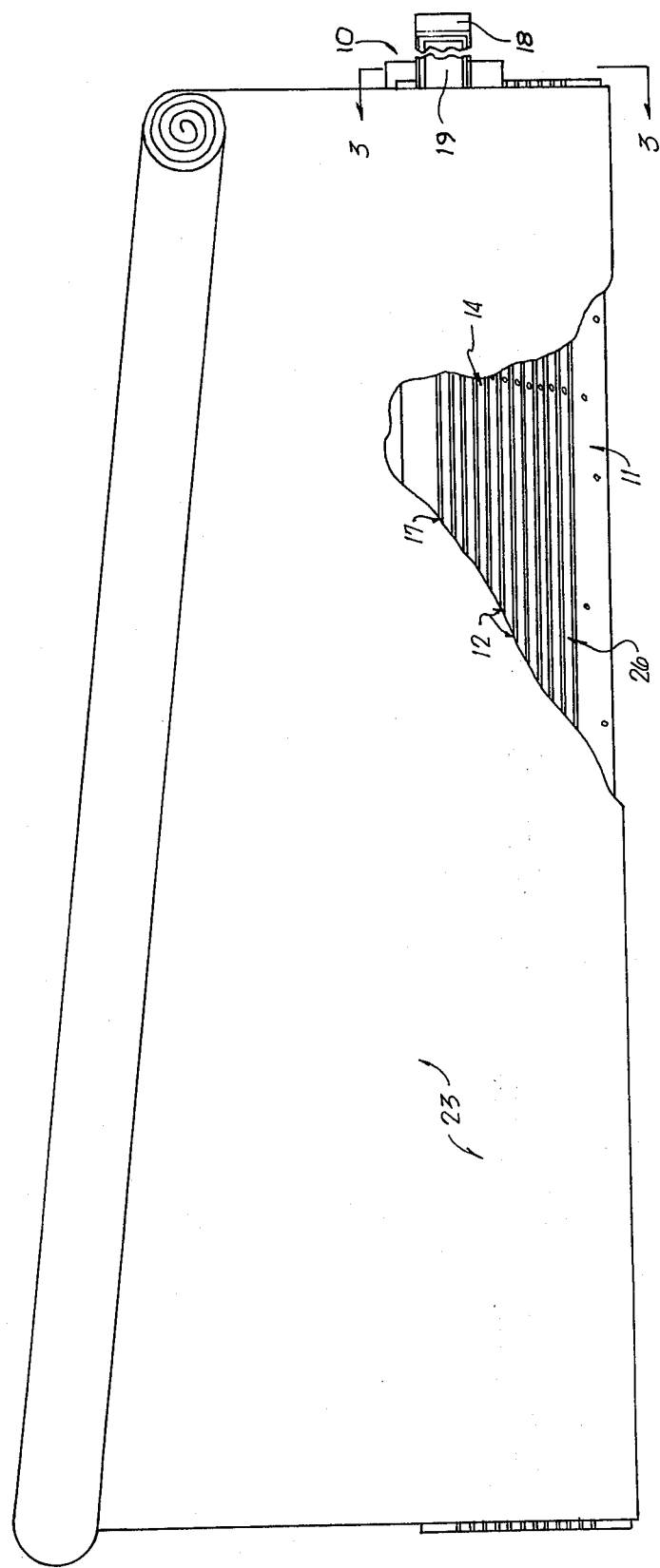
FIG. 1 is a top view of the assembled structure with carpet.
Figure 2:
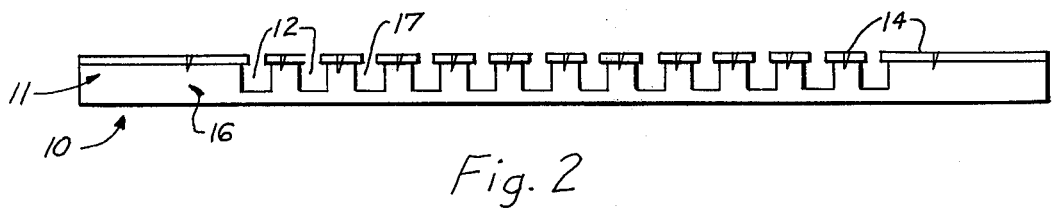
FIG. 2 is a cross sectional view taken along the line 2—2 in FIG. 5.
Figure 3:
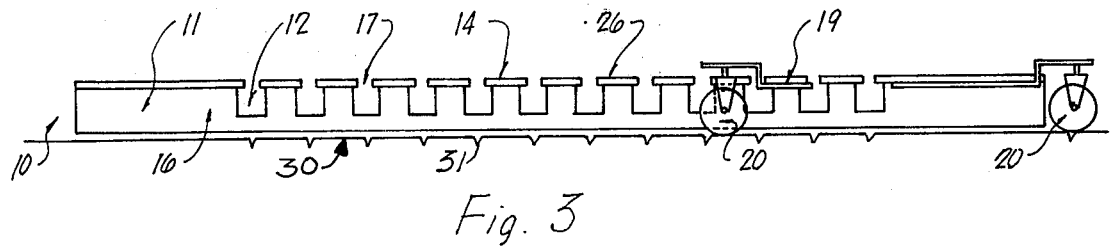
FIG. 3 is a cross sectional view taken along line 3—3 in FIG. 1.
Figure 4:
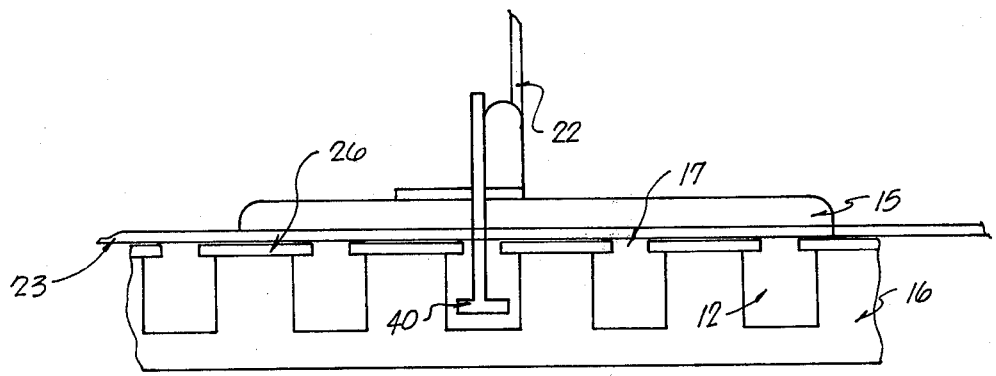
FIG. 4 is a partial side view of the guide with carpet and cutter in place.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications of the principles of the invention as illustrated therein being contemplated as would normally occur to one skilled in the art to which the invention relates.

The carpet cutter guide apparatus 10 comprises a base support structure 16 which can be made of plywood or any other structurally suitable material. The base support structure 16 must have the strength necessary to allow a plurality of grooves 12 to be made at intervals of approximately 1 inch apart throughout. This base support structure 16 is from about 12 inches to about 20 inches in width and from about 12 feet to about 20 feet in length although size is not critical and can be adapted to any carpet size. Preferably the base support structure is 17 1/4 inches in width and 16 feet in length. The 16 foot length may be made up of a single piece or any desired number of joined pieces. Additionally, the width may comprise several pieces, although it has been found most convenient to have a single piece in width. The preferred size allows added strength due to the greater width of the side panels.

A series of evenly spaced grooves 12 are made in base support structure 16. These grooves may be spaced at desirable intervals although the preferred interval is 1 inch. There may be as many grooves as desired and, in fact, there may be only one groove. However, the preferred embodiment would include a series of 12 grooves spaced 1 inch apart. The 1 inch spacing and the 12 groove total allow a carpet or other webbed or sheeted material to be cut to any desired unit of length. In addition, it should be noted that should total conversion to the metric system become a widespread reality, this unit would be easily transferred into a metric measurement into units of from about 2 to about 3 centimeters. The grooves themselves may be actually of any size and depth desired or necessary to accommodate the guide member 40. However, it has been found most convenient to have a groove one-half inch in width and one-half inch in depth. This size opening will allow any conventional guide member to perform its guiding operation. This also allows structural rigidity to be maintained in base support structure 16. As stated previously, the grooves 12 are in a straight line and run the entire length, preferably 16 feet, of the base support structure 16. However, it is conceivable that only partial cuts may be desired in a carpet or other material to be cut. In this case it would be possible to modify the grooves so as to define only a partial cut if, for instance, the carpet was to be cut only half-way across, or if material other than carpeting which came in sizes other than carpeting's 16 foot rolls was to be cut.

A surface structure 14 covers base support structure 16 and grooves 12. The surface structure defines the openings 17 into the grooves 12. The surface structure 14 should be made of a material that is both durable and has high strength characteristics. At the same time it is necessary that the surface structure 14 have a coefficient of friction allowing a carpet or other webbed or sheeting material when placed thereon to be easily slid across the surface of said surface structure 14. A particularly preferred material is ⅛ inch hot rolled steel. Other materials are, however, satisfactory and any material meeting the requirements set out hereinabove would be adequate for purposes of this invention. This might include any of the common industrially used metals or plastics. As an alternative embodiment the base support structure 16 and the surface structure 14 may be made of a single piece of structurally suitable material such as the commercial metals or plastics mentioned hereinabove. Preferably this single structural element would be extruded from said materials.

It will be noted that the surface structure 14 as it defines the openings 17 to the grooves 12 defines the openings as smaller than the groove 12 itself. This is not critical to the operability of the invention but is preferable from a functional standpoint. As described above, the grooves 12 preferably are one-half inch in width. Similarly the opening 17 is preferably approximately one-fourth inch in width although as before this is not critical. Again this allows accomodation of virtually any of the commercially available cutters when guide member 40 is attached. As one may appreciate from the drawings, each individual strip 26 of surface structure 14 must be individually fastened to base support structure 16. Fastening means are, of course, optional, but traditional screws or nails are adequate.

Optionally a movable carpet cutter holder 18 may be attached to the end of the assembled guide structure 10. As illustrated in the drawing, this movable carpet cutter holder 18 comprises a cutter support structure 19 mounted on wheels 20. The cutter support structure 19 is preferably not attached to the end 27 of base support structure 16 although in some cases it can be. The preferred arrangement is where the wheels 20 run on a track 30 which in turn has notched portions 31 at appropriate intervals to allow the cutter to be indexed into any of the individual grooves 12. The wheels 20 drop into the notches 31 and provide the necessary stability for the cutter support structure 19. Optionally a number plate with a plastic viewer may be attached to allow the user to know exactly what groove the cutter has been indexed into.

The cutter itself is, of course, optional and will depend upon the type of carpeting or other material to be cut; the speed with which the operator wishes to cut the carpet; and other factors which will depend completely on the type job to be done. A preferred type of cutter is sold under the trademark of Wolf "Slim Jim" carpet cutter with the rotary blade. The only requirement for the cutting apparatus 15 is that a surface exist to which a guide member 40 can be attached. Preferably the guide member 40 is T-shaped to provide additional strength and accuracy although member 40 may also be straight. A handle 22 is preferably attached to the cutter 15 to allow ease of operation and to allow the person operating said cutter to be in an upright walking position when cutting the carpet.

The carpet guide is operated by mounting the guide and support structure on a floor or other basic support structure As mentioned previously, the guide may be mounted or may simply be placed on the floor. A roll of carpeting is then draped over the surface structure 14. Conventionally this is done by a forklift holding the carpet roll in place while the carpeting is unrolled over the carpet cutter guide as is shown better in FIG. 1. As can be seen, the roll of carpeting 24 can be placed on the floor or held by a forklift. The unrolled carpeting 23 is then draped over the cutter guide. It is pulled out to the appropriate foot mark which is marked on the surface of the building floor. This leaves the portion to be cut directly over the carpet cutter guide. The appropriate slot may then be selected according to the size the carpet is desired to be cut. Optionally, holding means may be provided to insure that the carpeting 23 remains in place during the cutting operation. This, however, is normally not required as the bulk of the carpeting in addition to the strength of the forklift holding the carpet roll 24 is enough to provide stability of the carpet. When the carpet is in place the cutter 15 and specifically guide member 40 are engaged into a groove 12 from carpet cutter holder support structure 19. The cutter is then either manually or mechanically moved across the entire width of the groove thus cutting the carpet. Upon completion of the cut the carpet cutter is retraced again either manually or mechanically and placed back in the movable carpet cutter holder 18. The piece of carpeting may then be removed in its proper size. It is important to note here that a single person can now effectively, easily and conveniently cut the entire width of the carpet. This can be accomplished by a person driving a forklift to the appropriate holding position. The forklift would then be put in the appropriate park position with the carpet roll 24 slightly suspended. The same person could then unroll the carpet across the assembled cutter guide structure 10. He could pull it out to the appropriate foot marking on the floor. At this time the same person could come back and individually operate the cutter 15. Thus, what normally requires from three to five men now can be done by a single individual. Naturally using the same three to five men as required previously would allow a much quicker cutting operation which would be extremely important to large carpet retailers and wholesalers.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. Apparatus for guiding a carpet cutter along the width of a sheet of carpeting comprising:
   a. a base support structure sized appropriately to permit the entire width of a roll of carpeting to be flattened into a sheet;
   b. a plurality of evenly spaced grooves in said base support structure, said grooves being sized appropriately for receiving the guide member of a carpet cutter;
   c. a surface structure fixedly attached to said base support structure defining openings into said grooves, said openings into said grooves being narrower in width than said grooves; and
   d. a carpet cutter holder, said holder being mounted on rotating means, said rotating means being movable along the length of a track member, said track member having a plurality of recesses corresponding to each groove in said base support structure, said recesses indicating the proper positioning for said holder to allow said guide means attached to said cutter mounted on said holder to enter one of said grooves.

2. The apparatus of claim 1 wherein said base support structure is made using plywood.

3. The apparatus of claim 1 wherein said plurality of grooves comprises 12 grooves.

4. The apparatus of claim 3 wherein said grooves are spaced 1 inch apart.

5. The apparatus of claim 1 wherein said surface structure is band iron.

6. The apparatus of claim 1 wherein said surface structure is hot rolled steel.

7. Apparatus for guiding a carpet cutter along the width of a sheet of carpeting comprising:
   a. a plywood case support structure sized appropriately to permit the entire width of a roll of carpeting, said roll of carpeting being approximately 15 feet in width, to be flattened into a sheet;
   b. 12 grooves in said base support structure, said grooves extending the entire width of said base support structure and said grooves being spaced at intervals of approximately 1 inch;
   c. a surface structure fixedly attached to said base support structure defining openings into said grooves, said openings into said grooves being narrower in width than said grooves; and
   d. a carpet cutter holder, said holder being mounted on rotating means, said rotating means being movable along the length of a track member, said track member having a plurality of recesses corresponding to each groove in said base support structure, said recesses indicating the proper positioning for said holder to allow said guide means attached to said cutter mounted on said holder to enter one of said grooves.

* * * * *